(No Model.) 2 Sheets—Sheet 1.
L. KURTZ.
TRICYCLE.
No. 493,505. Patented Mar. 14, 1893.
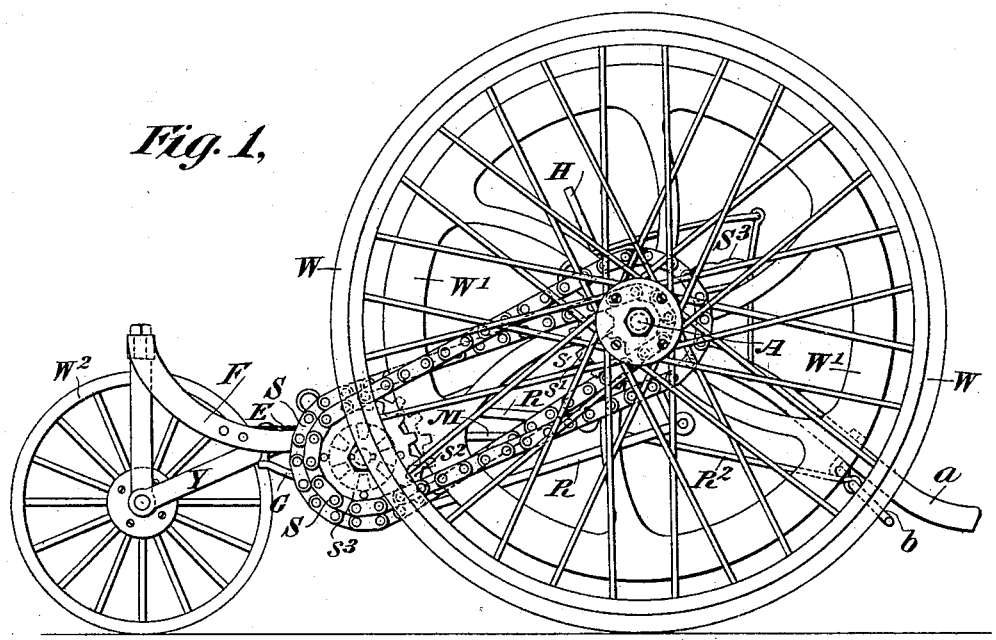
Fig. 1,
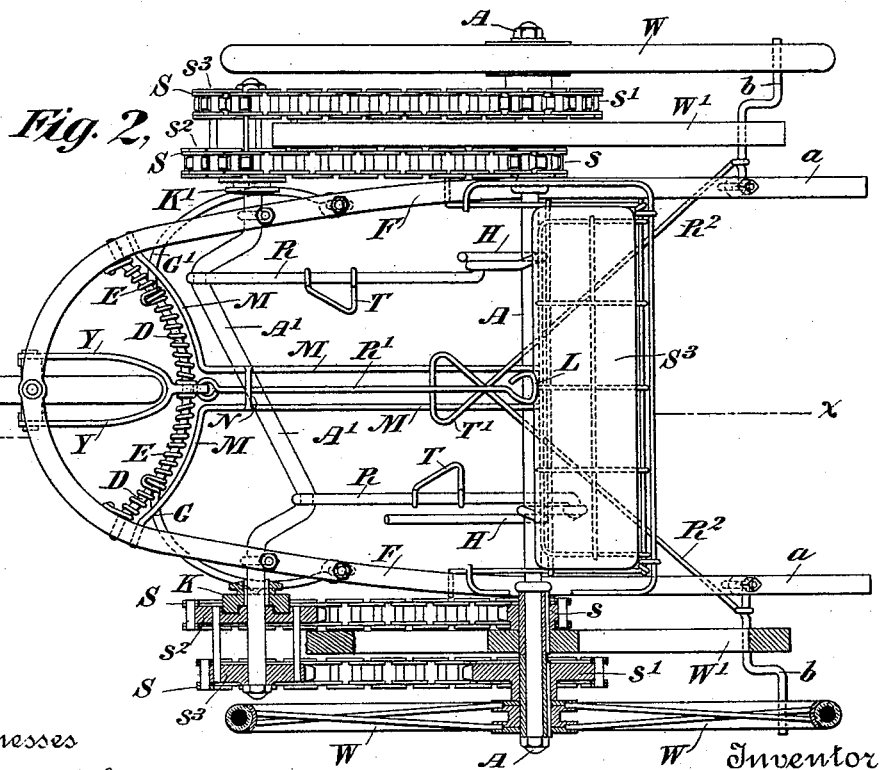
Fig. 2,
Witnesses
C. E. Ashley
H. W. Lloyd
Inventor
By his Attorney Louis Kurtz
Charles J. Kintner
THE NORRIS PETERS CO., PHOTO-LITHO., WASHINGTON, D. C.

(No Model.) 2 Sheets—Sheet 2.

L. KURTZ.
TRICYCLE.

No. 493,505. Patented Mar. 14, 1893.

Witnesses
C. E. Ashley
H. W. Loyd

Inventor
Louis Kurtz
By his Attorney
Charles J. Kimmer

UNITED STATES PATENT OFFICE.

LOUIS KURTZ, OF NEW YORK, N. Y.

TRICYCLE.

SPECIFICATION forming part of Letters Patent No. 493,505, dated March 14, 1893.

Application filed July 2, 1892. Serial No. 438,800. (No model.)

*To all whom it may concern:*

Be it known that I, LOUIS KURTZ, a subject of the Czar of Russia, residing at New York, in the county of New York and State of New York, have invented certain new and useful Improvements in Tricycles, of which the following is a specification.

My invention is directed particularly to improvements in wheel vehicles propelled by the rider, such as bicycles, tricycles and the like, and it has for its objects: First the adaptation of means for giving the apparatus impetus or momentum when once set in motion; second to simplify and improve the steering apparatus of such vehicles; third to devise novel and efficient braking devices; and fourth to provide means for detaching the propelling power from either wheel of the vehicle as it turns in a given direction, and again connecting such parts as the vehicle assumes a forward motion in a direct line. I accomplish these objects by mechanism hereinafter described, the novel features of which are especially pointed out in the claims at the end of this specification.

Although all of the features of my invention are described in the following specification and illustrated in the accompanying drawings as applicable to a special form of hand or foot impelled vehicles known as tricycles, it is obvious that some of the features thereof are applicable to other vehicles of the same generic class, such for instance as bicycles, four-wheeled vehicles and the like.

Figure 3:
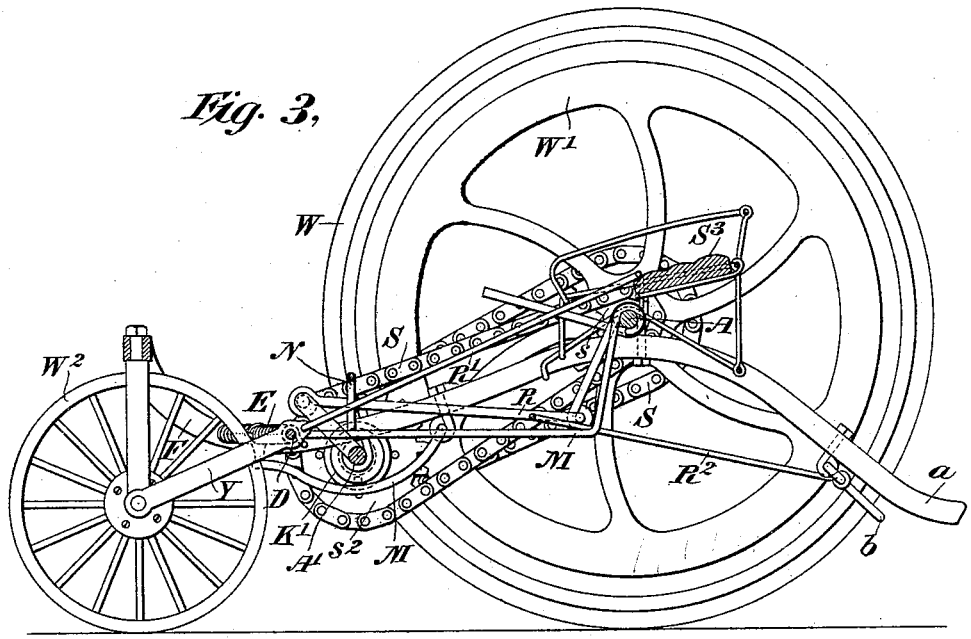
Figure 4:
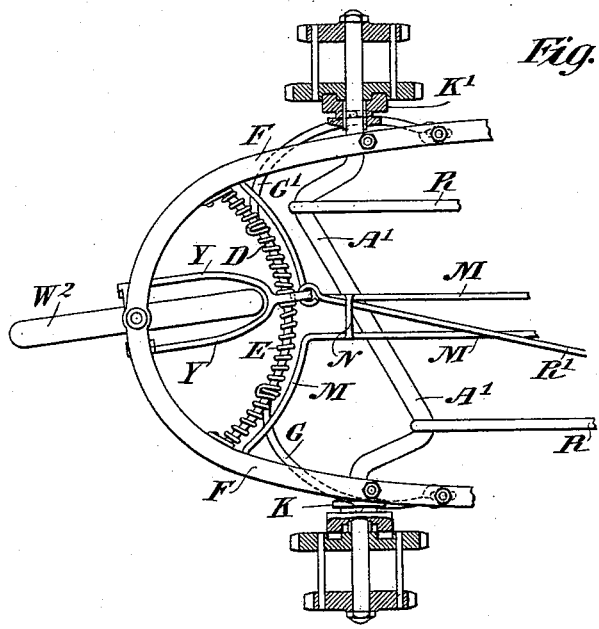

Referring to the drawings in all of which like letters of reference represent like parts wherever used, Figure 1 is a side elevational view, and Fig. 2 a plan view of a tricycle embodying my improvements, the latter figure being illustrated partly in section. Fig. 3 is a vertical longitudinal section taken through the entire machine on line $x-x$ Fig. 2, parts being shown in elevation, and as seen looking from the bottom toward the top of the drawings. Fig. 4 is a detail part sectional part plan view of the front portion of the machine illustrating the steering gear and the driving pinions together with their controlling clutches and attached parts.

W W are the main driving wheels of well known form, and A the axle joining them together.

F is the frame pivotally secured to the axle A in the usual manner and provided with rear extensions $a$ like those in general use for preventing the rider from tilting over backward.

$W^2$ is a steering wheel of the usual pattern pivotally secured to the front part of the frame F.

W' W' are fly wheels loosely journaled upon the axle A at points near the wheels W W.

$s$ and $s'$ are sprocket wheels keyed to the axle A and $s^2 s^3$ are additional sprocket wheels united together in pairs on the opposite ends of the treadle or propelling crank A', which is in turn journaled on the under side of the frame F.

S S are sprocket chains uniting the pairs of sprocket wheels $s$ $s'$, and $s^2$ $s^3$, the sprocket wheels $s$ $s$ being secured to and moving with the fly wheels W' W' upon the axle A.

K K' are clutches splined upon the treadle crank A' and adapted to be thrust into or withdrawn from operative relation with the sprocket wheels S, said clutches being operatively connected with levers G G' pivoted at their inner ends to the frame F and movably secured at their outer ends to a spring E, which is carried by a curved cross bar D secured to the frame F.

R R are the treadle rods pivoted on the axle A and attached to the treadle crank A' in the usual manner and provided with foot treadles T for the feet, and hand levers H for the hands of the operator.

$S^3$ is the seat secured in the usual way to the body of the machine.

M M are guide rods secured at their rear ends to the axle and at their front and outwardly extended ends to the frame F, being provided with an upwardly extended loop N which unites them together and acts as a guideway and fulcrum for the steering lever R secured to a yoke Y connected to the steering wheel $W^2$, L being the operating handle therefor.

$R^2$ $R^2$ is a brake rod, the inner looped end of which constitutes a foot rest adapted to slide back and forth upon the guide rods M M, the outer ends being secured to the brake levers $b$ $b$ pivotally attached to the extensions $a$ $a$.

The operation of the apparatus is as follows: The rider sitting upon the seat $S^3$ uses his feet upon the treadles T and his hands with the hand levers H, and the machine continues to move under the power applied in a forward direction without manipulating the steering apparatus so long as he chooses to propel it. When he wishes to vary his course, he simply lifts the steering rod R' by the handle L and turns it say to the left (see Fig. 4) then pushes upon it so as to compress the right hand end of the spring E and place the left end thereof under tension, thus drawing the outer end of the clutch lever G forward and causing the clutch K to be released from the sprocket wheel S, thereby allowing the left hand fly wheel W' to run freely of its own momentum and disconnecting the application of the power through the left hand drive wheel W, the power being all now applied upon the right hand wheel W so long as the machine continues to run to the left. Upon reversing the direction of the operating rod R' and moving it as before, the machine will run to the right and in like manner the clutch K' will be released and the right hand wheel W and fly wheel W' allowed to run freely, the power being now applied solely to the left hand drive wheel W and fly wheel W'.

When the rider desires to apply the brake, he simply presses one foot or both if need be, against the loop T' of the brake rod $R^2$, thereby causing the pivoted brake levers $b$ to press their outer ends upon the faces of the wheels W W. Should it be required to apply further braking power in order to check the headway by continued and stronger pressure, the rider will cause the brake rods $b$ to bend temporarily and come into frictional contact with the faces of the brake wheels W' W', thereby tending to check them and bring the machine to a standstill.

I do not limit myself to the special details of construction herein shown and described as many of them may be materially departed from and still come within the scope of my claims hereinafter made.

Having thus described my invention, what I claim, and desire to secure by Letters Patent of the United States, is—

1. A wheel vehicle having a pair of driving wheels, driving gearing operatively connecting said driving wheels with pedal mechanism; a steering wheel held normally in a central position by yielding means; an operating lever or rod connected to the steering wheel and resting in a guideway the sides of which constitute fulcra for said lever with intermediate connections between the operating lever and the driving gearing consisting of sprocket wheels and clutches operatively connected therewith, said clutches being attached to the opposite ends of a single spring supported by a curved cross bar carried by the frame and arranged as described for connecting and disconnecting the driving gearing to and from either of the driving wheels at will.

2. A wheel vehicle having a pair of driving wheels and a pair of fly wheels in combination with brake mechanism consisting of brake levers $b\ b$ pivotally attached to extensions $a\ a$ and operatively connected through brake rods $R^2$ $R^2$ having foot rests on their inner ends and sliding bearings sustained by the frame of the vehicle, the outer ends of the brake levers $b\ b$ extending past the faces of the fly wheels and drive wheels, whereby when they are actuated they are first brought into frictional contact with the drive wheels and on the application of further power afterward brought into frictional contact with the faces of the brake wheels substantially as described.

LOUIS KURTZ.

Witnesses:
C. J. KINTNER,
M. M. ROBINSON.